June 8, 1965 C. O. HARRIS 3,188,004
TRIANGULAR SLIDE RULE
Filed Sept. 19, 1962 3 Sheets-Sheet 1
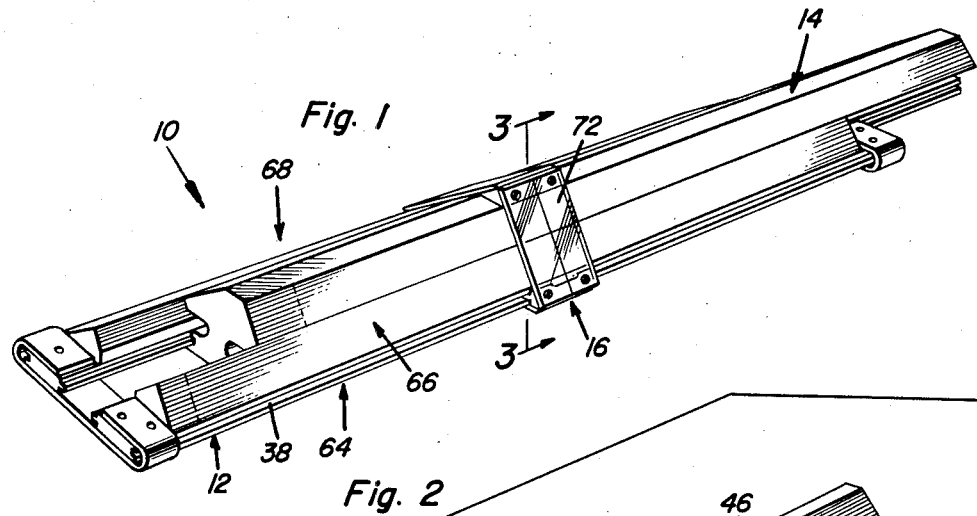
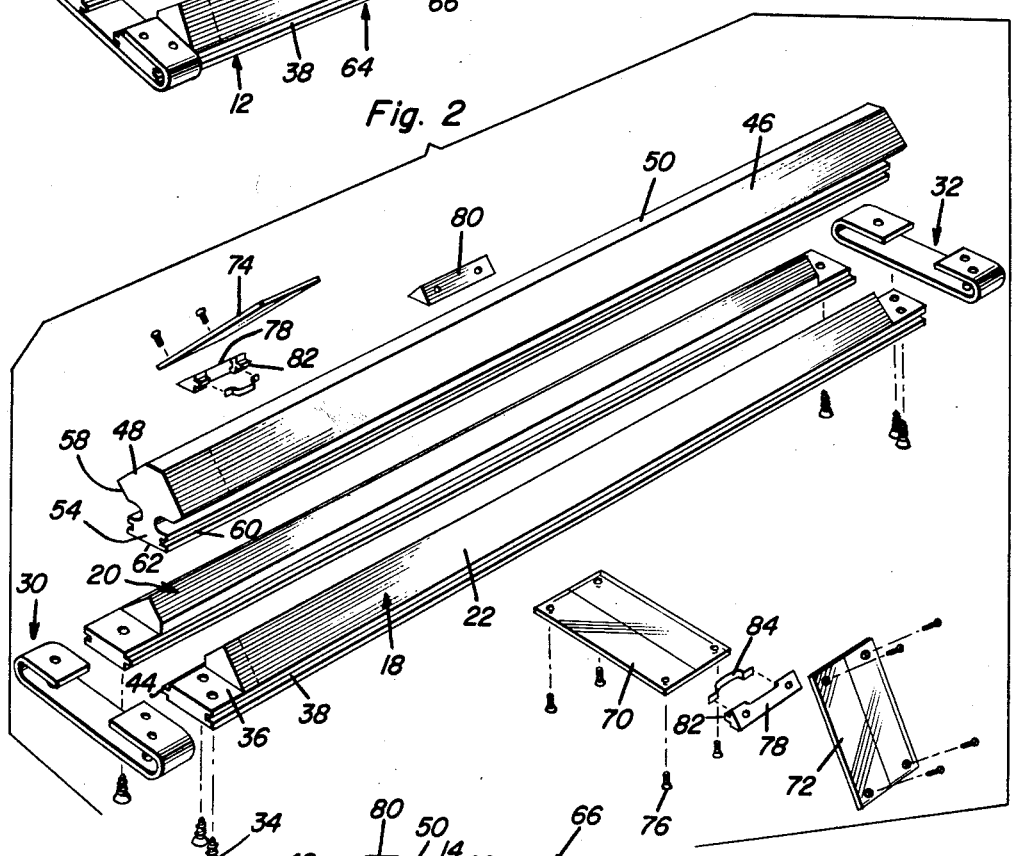
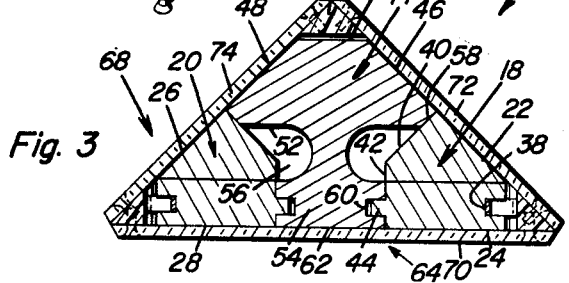
Charles O. Harris
INVENTOR.

June 8, 1965
C. O. HARRIS
3,188,004
TRIANGULAR SLIDE RULE
Filed Sept. 19, 1962
3 Sheets-Sheet 2
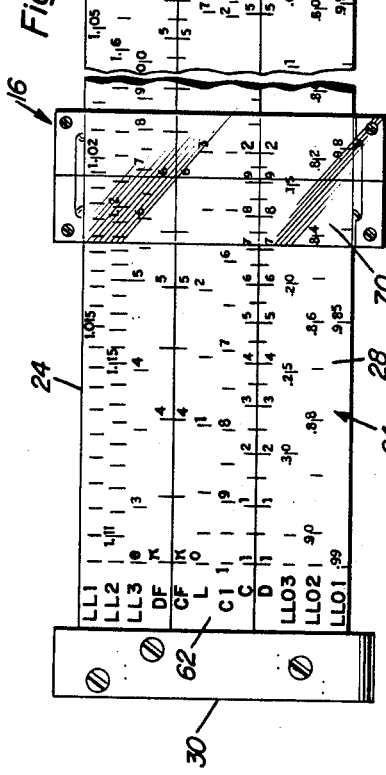
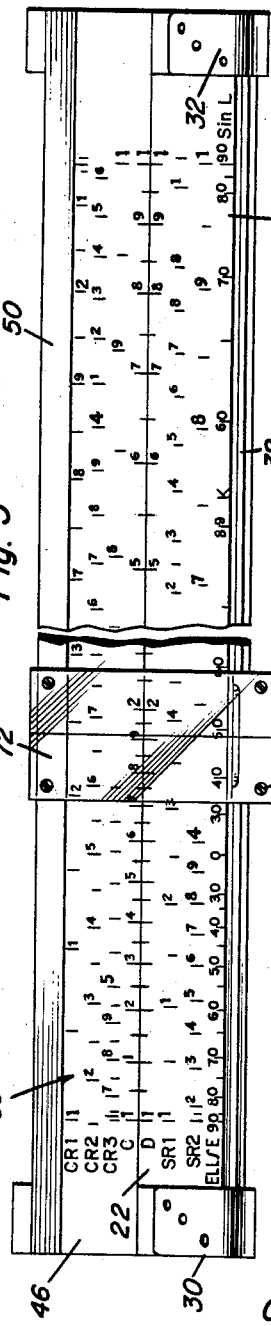
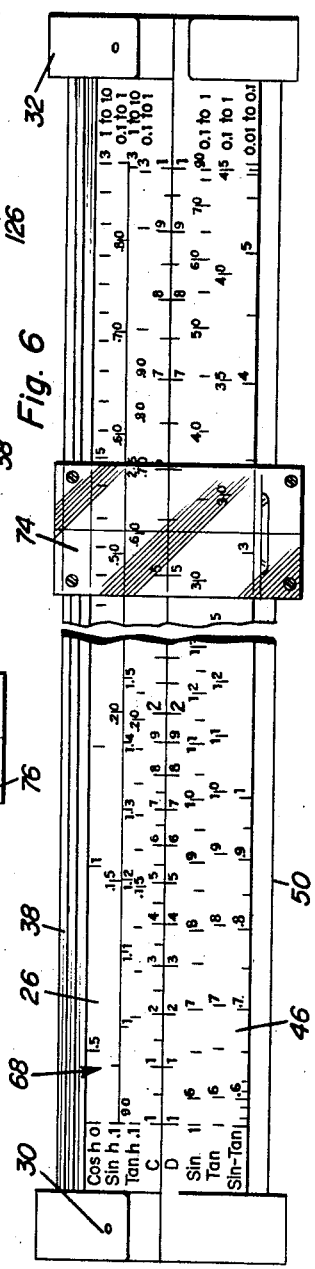
Charles O. Harris
INVENTOR.

June 8, 1965  C. O. HARRIS  3,188,004
TRIANGULAR SLIDE RULE
Filed Sept. 19, 1962  3 Sheets-Sheet 3

Charles O. Harris
INVENTOR.

BY Clarence A. O'Brien
and Harvey B. Jacobson
Attorneys

United States Patent Office 3,188,004
Patented June 8, 1965

3,188,004
TRIANGULAR SLIDE RULE
Charles O. Harris, East Lansing, Mich., assignor, by mesne assignments, to L. L. Ridgway Enterprises, Inc., a corporation of Texas
Filed Sept. 19, 1962, Ser. No. 224,611
6 Claims. (Cl. 235—70)

This invention relates to a new and useful slide rule.

An important object of the present invention is to provide a slide rule construction and scale arrangement resulting in more rapid identification of the slide rule scales, facilitating more rapid calculations and otherwise easing mental activity.

Another object of the present invention is to provide a slide rule arrangement providing facilities for a larger number of mathematical operations and greater legibility as compared to other slide rules.

A further object of the present invention is to provide a slide rule arrangement of scales capable of being more easily identified, and orientated.

In accordance with the foregoing objects, the present invention features a slide rule base assembly presenting four exposed base scale faces disposed in different planes at 45° to each other, two of the base scale faces being disposed in the same plane but being separated by one face of a single slide member, the other two faces of which cooperate with the other two faces of the base assembly to thereby form three useful slide rule sides offering a greater number of slide rule scales, more convenient scale viewing and wider spacing. The base assembly and slide member are therefore also associated with an indicator runner assembly having windows disposed in each of the three side planes of the slide rule for use in connection with all of the slide rule scales. The slide rule of the present invention therefore features in addition to the usual slide rule scales, elliptic integral scales, sines of large angles, as well as hyperbolic function scales. Furthermore, each of the slide rule sides contains the usual multiplication-division scales so as to eliminate the need for rotation of the slide rule.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an assembled slide rule made in accordance with the principles of the present invention.

FIGURE 2 is a perspective view of the disassembled parts of the slide rule illustrated in FIGURE 1.

FIGURE 3 is a transverse sectional view taken substantially through a plane indicated by the section line 3—3 in FIGURE 1.

FIGURES 4, 5 and 6 are front elevational views of the slide rule as viewed from each of the sides thereof.

Figure 7:
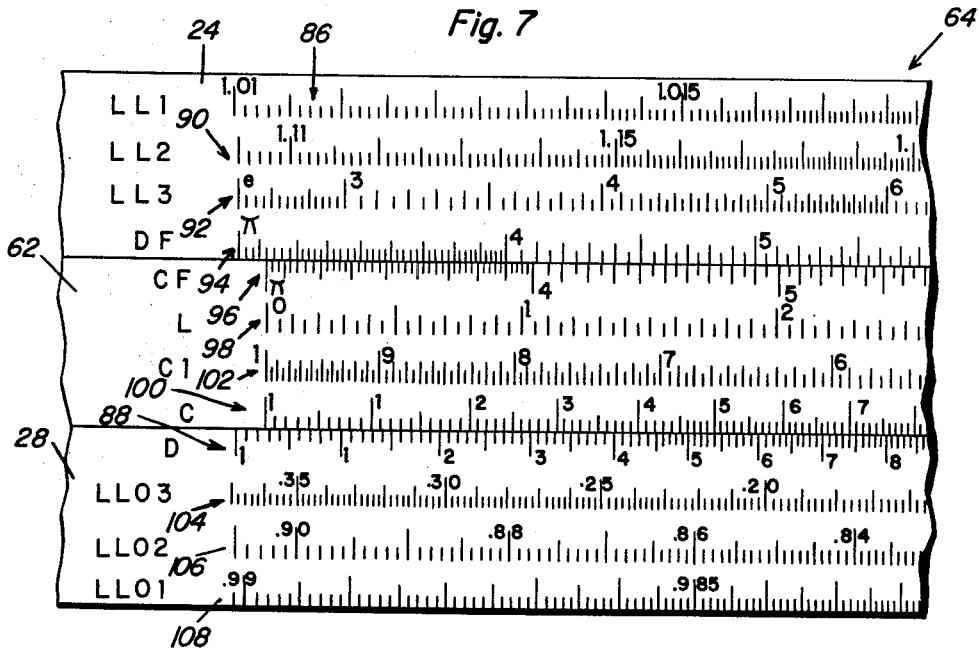
FIGURES 7, 8 and 9 are enlarged partial front elevational views illustrating portions of the scales as shown in FIGURES 4, 5 and 6, respectively.

Referring now to the drawings in particular, it will be observed from FIGURES 1, 2 and 3 that the slide rule assembly generally referred to by reference numeral 10 includes a base assembly generally referred to by reference numeral 12, a slide member generally referred to by reference numeral 14, and an indicator runner assembly generally referred to by reference numeral 16. The base assembly 12 is formed by a pair of parallel spaced stock pieces 18 and 20. The stock piece 18 includes two exposed base faces 22 and 24 which are disposed in planes forming a 45° angle with each other. Similarly, the stock piece 20 includes exposed faces 26 and 28 which form a 45° angle with each other. The stock pieces are held in assembled relation to each other by means of end bracket members 30 and 32 one of which may be colored so as to facilitate orientation of the slide rule. The end bracket members 30 and 32 are secured to the stock pieces 18 and 20 by means of fasteners 34 which extend through the end bracket members and alined apertures at the recessed end portions 36 of each of the stock pieces. A sliding guide groove 38 is formed on the interconnecting bevelled face between the exposed faces of the stock pieces and is adapted to guide the sliding movement of the indicator runner assembly 16 thereover. Interconnecting the exposed faces of each of the stock pieces, are intersecting guide surfaces 40 and 42, the guide surfaces 42 on each of the stock pieces, confronting each other and being provided with guide projections 44 adapted to slidingly cooperate with the slide assembly 14.

The slide member 14 is formed of a single piece bridging the stock pieces 18 and 20 and having a pair of exposed faces 46 and 48 which are interconnected by an upper bevelled face 50. The slide faces 46 and 48 form a right triangle the base portion 62 of which is connected to a guide portion 54 to form a pair of longitudinally extending slide relief slots 56 so as to reduce the slide friction area of the slide surfaces 58. The guide portion 54 is also provided with a pair of parallel grooves 60 which receive the projections 44 from the stock pieces 18 and 20 so as to slidingly guide the slide assembly 14 with respect to the base assembly. Also, the guide portion 54 forms an exposed slide scale face 62 which separates the base scale faces 24 and 28. It will therefore be apparent, that the assembly of the base and slide form three slide rule sides disposed in different planes including the larger side 64 formed by the base scale faces 24 and 28 separated by the slide scale face 62, the side 66 formed by the base face 22 and slide face 46, and the third side 68 formed by the base face 26 and the slide face 48.

Slidably mounted on each of the sides 64, 66 and 68 of the slide rule, is an indicator runner which includes three transparent window portions 70, 72 and 74. The larger window portion 70 is interconnected by a plurality of fasteners 76 and the corner connector elements 78 to the window portions 72 and 74 which in turn are interconnected by a runner apex element 80. The apex element 80 is spaced from the bevelled face 50 of the slide member by a slight clearance. The corner connector portions 78 on the other hand are provided with slide engaging projections 82 adapted to be received within the guide grooves 38 in the stock pieces 18 and 20. Also disposed between the projections 82, for yieldable engagement between the connector elements 78 and the grooves 38, are yieldable spring elements 84 arranged to maintain the proper sliding friction between the indicator assembly 16 and the base assembly.

Figure 8:
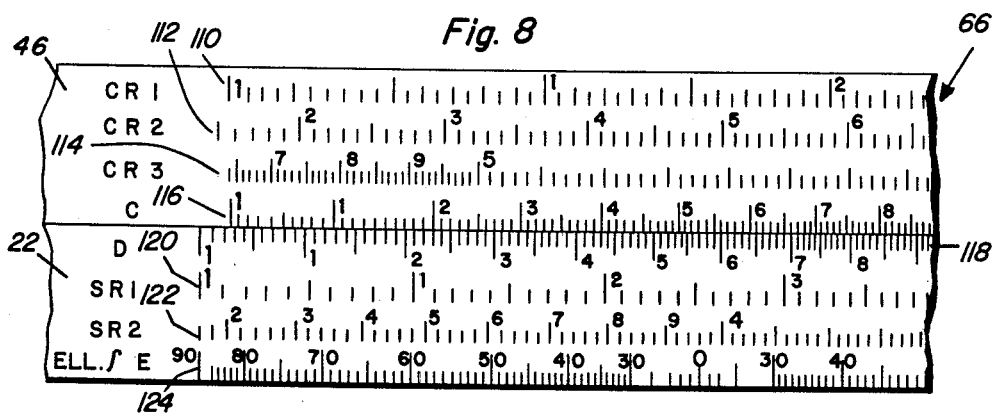
Figure 9:
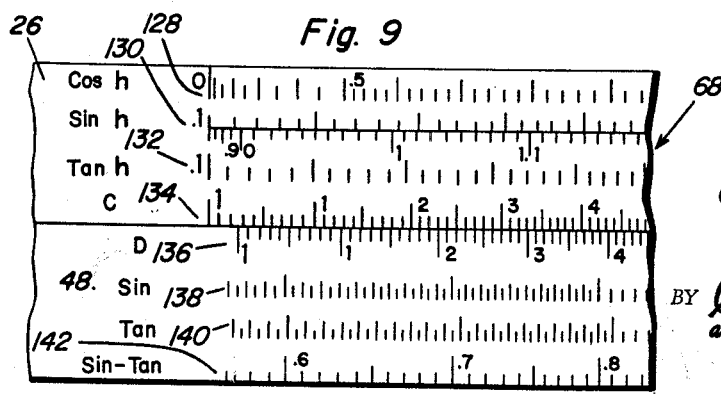

Referring now to FIGURES 4 through 9, it will be observed that the largest area side 64 of the slide rule mounts a relatively larger number of scales the marks of which are widely spaced because of the available room and furthermore mounts those scales which are most commonly used inasmuch as the slide rule side 64 is the largest size and may be conveniently viewed when the slide rule is resting on the side 68. The face 24 of the slide rule is provided with a scale 86 for positive powers of numbers, one example of which is powers of the Naperian constant $e$ between 0.01 and 0.1 keyed to the scale 88 on the face 28. A second scale 90 for positive powers of numbers one example of which is powers of $e$ between 0.1 and 1 keyed to the scale 88 is also provided below the scale 86. Positive powers of numbers, one example of which is powers of *e* between 1 and 10 keyed to the scale 88, are obtained from the third scale 92 on the face 24. A folded scale 94 for multiplication and division forms the fourth scale on the face 24 adjacent to the edge of the face 24 abutting the edge of face 62 of the slide member. A folded scale 96 cooperating with the scale 94 is therefore formed on the face 62 for multiplication and division purposes. Disposed below the scale 96, is a log scale 98 for the mantissae of common logarithms keyed to the lowest scale 100 on the face 62. A scale 102 of reciprocals is also formed on the face 62 between the scale 98 and 100. Cooperating with the basic scale 100 for multiplication and division purposes, is the basic scale 88 on the face 28 below which is formed the scale 104 for negative powers of numbers, one example of which is powers of *e* between −1 and −10 keyed to the scale 88. A second scale 106 for negative powers of numbers, one example of which is powers of *e* between −0.1 and −1 keyed to scale 88 is also formed below scale 104. A third negative powers scale 108 for powers of numbers one example of which is powers of *e* between −0.01 and −0.1 keyed to scale 88, is formed at the lower edge of the face 28.

Face 66 of the slide rule contains information for obtaining the roots and powers of numbers as well as three special scales. The face 46 thus contains the scales 110, 112 and 114 for obtaining the cube roots of numbers or the cubes of numbers. Also provided on the face 46, is the basic scale 116 with respect to which the cube root scales are keyed and by means of which multiplication and division is performed in cooperation with the basic scale 118 on the base face 46. The face 22 also is provided with the scales 120 and 122 for obtaining the square roots of numbers or the squares of numbers, keyed to the basic scale 118. The lower edge portion of the face 22 is provided with a special scale 124 on the left hand portion thereof for obtaining elliptic integrals. The right hand portion of the face 46 as seen in FIGURE 5, includes a scale 126 for the sines of large angles, the scale 126 being keyed to scale 114 on the face 46.

The slide rule side 68 is arranged to contain scales for obtaining trigometric and hyperbolic functions. Scales 128, 130 and 132 are therefore provided for obtaining hyperbolic cosines between 0 and 3, hyperbolic sines of numbers between 0.1 and 3 and hyperbolic tangents of numbers between 0.1 and 3 respectively, all keyed to the basic scale 134. The face 48 therefore is also provided with a basic scale 136 cooperating with the scale 134 for performing multiplication and division. It will therefore be appreciated, that each of the three sides of the slide rule is provided with face scales for multiplication and division purposes, whereby rotation of the slide rule from one side to another is not necessary when multiplication and division must be performed in connection with some other calculation. The base face 26 is also provided with a scale 138 for obtaining the sines of angles between 5.7° and 90°, a scale 140 for obtaining the tangents of angles between 5.7° and 45°, and a scale 142 for obtaining sines and tangents of angles between 0.56° and 5.7°, all of the scales 138, 140 and 142 being keyed to the basic scale 136.

From the foregoing description, the operation and utility of the slide rule of the present invention will be apparent. The stock pieces 18 and 20 may be made of any suitable material such as plastics, metal or wood having a hard surface coating. The end brackets 30 and 32 on the other hand must be made of a relatively rigid material such as metal while the indicator runner assembly 16 will be made of transparent material for the window portions thereof such as plastic or glass. Also, each of the different sides 66, 64 and 68, will be colored a different color so as to facilitate identification of the scales. For example, one face may be ivory, the other pale green and the third face pale blue. Also, the left hand bracket 30 may be colored red while the right hand is uncolored so that the slide rule may be easily orientated as hereinbefore indicated. It will also be appreciated, that the side 64 of the slide rule containing those scales most commonly used, will be advantageously disposed at a 45° angle incline with respect to the other sides so that when the slide rule rests upon a horizontal surface the faces of the side 64 will be at a convenient viewing angle. The aforementioned advantageous attributes of the slide rule of the present invention will therefore be apparent.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A slide rule comprising, base means presenting four separate base scale faces in three intersecting planes and slide means slidably mounted by the base means for bridging two of said base scale faces and presenting three separate slide scale faces simultaneously movable in said three intersecting planes respectively, said slide means having guides engageable with said base means between said two base scale faces coplanar with one of the slide scale faces.

2. A slide rule comprising, base means presenting four separate base scale faces in three intersecting planes and slide means slidably mounted by the base means for bridging two of said base scale faces and presenting three separate slide scale faces simultaneously movable in said three intersecting planes respectively, only one of said three intersecting planes containing two of the base scale faces separated by one of said slide scale faces, said one of the three interesecting planes being disposed at 45° angles to the other of said three intersecting planes for convenient viewing when the slide rule is resting on one of said other of the three intersecting planes, said base means comprising a pair of parallel spaced stock pieces, each stock piece having exposed scale faces disposed at an acute angle to each other and slide surface means interconnecting said exposed scale faces for slidably guiding the slide means, and end bracket means secured to said stock pieces for holding same in assembled relation, said end bracket means including a pair of rigid bracket members secured to recessed end portions of said stock pieces, said slide means comprising a single slide member having two exposed slide faces disposed at 90° to each other cross-sectionally forming a right triangle having a base portion enclosed by the base means, guide means connected to said base portion for guiding engagement with said base means and forming a third slide face exposed through said base means, said slide scale faces being coplanar with the base scale faces in the respective planes, and guide means formed on the base means for engagement with the slide member between said two base scale faces bridged by the slide member.

3. A slide rule comprising, base means presenting four separate base scale faces in three intersecting planes, and slide means slidably mounted by the base means for bridging two of said base scale faces and presenting three separate slide scale faces simultaneously movable in said three intersecting planes respectively, and indicator slidably mounted on the base means and slide means, said indicator having window means disposed substantially in each of said three intersecting planes and yieldable guide means slidably engageable by the base means.

4. A slide rule comprising, base means presenting four separate base scale faces in three intersecting planes, and slide means slidably mounted by the base means for bridging two of said base scale faces and presenting three separate slide scale faces simultaneously movable in said three intersecting planes respectively, said slide means comprising, a single slide member having two exposed slide faces disposed at 90° to each other cross-sectionally forming a right triangle having a base portion enclosed by the base means, guide means connected to said base portion for guiding engagement with said base means and forming a third slide face exposed through said base means.

5. A slide rule comprising base means presenting more than two separate base scale faces in different planes disposed at acute angles to each other and a single slide member slidably mounted by the base means for bridging two of said base scale faces and presenting slide scale faces in each of said different planes for cooperation with each of said base scale faces, said slide scale faces being coplanar with the base scale faces in the respective planes, and guide means formed on the base means for engagement with the slide member between said two base scale faces bridged by the slide member.

6. A slide rule device comprising, a base assembly formed by a pair of elongated base members having recessed end portions and end brackets interconnecting the end portions for maintaining the base members in parallel spaced relation to each other, said base members having confronting guide surfaces and exposed base faces disposed in three intersecting planes, a single slide member bridging the base members and having face portions disposed in said intersecting planes and spaced bearing portions engaging the confronting guide surfaces adjacent to two of the base faces respectively disposed in two of said intersecting planes, guide means mounted adjacent two other of said base faces disposed in the third of said intersecting planes for guidingly engaging the slide member to expose one of the face portions between the two of the base faces in said third intersecting plane.

References Cited by the Examiner

UNITED STATES PATENTS

| | | | |
|---|---|---|---|
| 603,695 | 5/98 | Keuffel | 235—70 |
| 887,390 | 5/08 | Hall | 235—70.1 |
| 1,942,754 | 1/34 | Heyssler | 235—85 |
| 2,076,242 | 4/37 | Marquis | 235—85 |
| 2,382,064 | 8/45 | Judd | 235—70 |
| 2,465,238 | 3/49 | Laux | 235—85 |

FOREIGN PATENTS

| | | |
|---|---|---|
| 207,530 | 3/09 | Germany. |
| 496,664 | 7/54 | Italy. |

LEO SMILOW, *Primary Examiner.*